United States Patent [19]

Bailey

[11] 4,112,176

[45] Sep. 5, 1978

[54] GROUND RUBBER ELASTOMERIC COMPOSITE USEFUL IN SURFACINGS AND THE LIKE, AND METHODS

[75] Inventor: Allen R. Bailey, Vicksburg, Miss.

[73] Assignee: U.S. Rubber Reclaiming Co., Inc., Miss.

[21] Appl. No.: 659,751

[22] Filed: Feb. 20, 1976

Related U.S. Application Data

[63] Continuation-in-part of Ser. No. 486,328, Jul. 8, 1974, abandoned.

[51] Int. Cl.² .................... B32B 3/26; B32B 5/16; C09J 3/18
[52] U.S. Cl. .................... 428/304; 428/327; 428/403; 428/407; 428/425; 428/85; 156/242; 156/331; 428/320
[58] Field of Search .................... 156/242, 331; 260/77.5 AM, 858, 2.5 BE; 428/304, 316, 323, 327, 403, 407, 320, 425, 2

[56] References Cited

U.S. PATENT DOCUMENTS

| | | | |
|---|---|---|---|
| 2,778,810 | 1/1957 | Muller et al. | 260/858 |
| 2,929,800 | 3/1960 | Hill, Jr. | 260/77.5 AM |
| 3,272,098 | 9/1966 | Buchholtz et al. | 427/136 |
| 3,597,297 | 8/1971 | Buchholtz et al. | 428/425 |
| 3,801,421 | 4/1974 | Allen et al. | 428/323 |
| 3,936,576 | 2/1976 | Kay | 428/425 |
| 3,968,089 | 7/1976 | Cuscurida | 260/2.5 BE |

Primary Examiner—William R. Dixon, Jr.
Attorney, Agent, or Firm—Robert Irving Williams

[57] ABSTRACT

There is provided a polyurethane ground rubber composite and a new method for formation and preparation thereof. The composite is suitable for use in laminated and other surfacing or as a surfacing and has excellent flexibility, resiliency, weatherability, and elastomeric qualities; and comprises particulate vulcanized rubber substantially coated on each particle with about 3 to about 8 microns, and in some instances about 3 to about 10 microns, of a cross-linked binder derived from an essentially solvent-free polymeric isocyanate prepolymer having a number average molecular weight of 800–4000, the cross-linking of the isocyanate prepolymer being accomplished by controlled reaction with water using an equivalent ratio of NCO/OH of 0.14/1 to 0.83/1 to form urea and buiret linkages, and providing a void content of 25-60 volume percent, so that the carbon dioxide generated by the water/isocyanate reaction can readily diffuse through the film and so that the vented carbon dioxide does not cause foaming of the composite; and methods of controlling the forming of the composite, the layering of the composite, and/or mixing it in situ.

15 Claims, 4 Drawing Figures

- 7 — POLYMERIC SEAL COAT
- 5 — MOISTURE CURED COMPOSITE
- 11 — CEMENT CONCRETE

- 12
- 10
- 11 — CARPET
- 5a — COMPOSITE
- 9 — ASPHALT CONCRETE

- 12
- 10 — CARPET
- 11
- 5a — COMPOSITE

- 15 — STEEL
- 5a — SOUND DEADENING COMPOSITE

GROUND RUBBER ELASTOMERIC COMPOSITE USEFUL IN SURFACINGS AND THE LIKE, AND METHODS

CROSS-REFERENCE TO RELATED APPLICATION

This application is a continuation-in-part of my copending application, Ser. No. 486,328 filed July 8, 1974 now abandoned.

BACKGROUND OF THE INVENTION

1. Field of the Invention

This invention relates to methods for formation and fabrication of a particulate vulcanized rubber composite suitable for use in laminated and in or as other surfacing application, and to such composites particularly composites comprising bonded particulate vulcanized rubber and useful surfacings, sound absorbing materials, underlayers for recreational surfaces or other pavement or flooring, as a pad for carpeting (as for artificial turf), tile, and linoleum, and similar purposes.

2. Description of the Prior Art

Many proposals have been made for using particulate vulcanized rubber in surfaces, laminates, and padding for carpeting, tile, linoleum and recreational surfacing. Various binders such as asphalt, synthetic and natural rubber latices, epoxides, and polyurethanes have been used in commercial systems, all of which suffer from certain deficiencies. The asphalt-based binders are not tough enough and have poor physical properties. The polyurethane systems have excellent durability and performance, but have been plagued by installation difficulties, especially and this is particularly true of the pour-and-cure-in-place systems. Particulate vulcanized rubber has been used to reduce the costs of the pour-in-place polyurethane system, but the presence of absorbed water, acids, amines, and thiol groups in the particulate rubber produce inconsistent results and frequently result in uncured surfacing which must be removed and reapplied.

SUMMARY OF THE INVENTION

This invention relates generally to a polyurethane ground rubber composite, and a new method for formation and preparation thereof, suitable for use in laminated and other surfacing or as a surfacing and having excellent flexibility, resiliency, weatherability, and elastomeric quality. The composite may comprise particulate vulcanized rubber (e.g. 60–95 weight percent) each particle of which is substantially coated with from about 3 to about 8 microns, and in some instances from about 3 to about 10 microns, in thickness of a cross-linked binder (e.g. 5–40%) derived from an essentially solvent-free polymeric isocyanate prepolymer (having, e.g. a viscosity at 25° C. of 1,000–12,000 c.p.s.) and containing 3–10 percent excess NCO, and wherein the polymeric isocyanate prepolymer has a number average molecular weight of 800–4000, the cross-linking of the isocyanate prepolymer being accomplished by controlled reaction with water using an equivalent ratio of NCO/OH of 0.14/1 to 0.83/1 ($H_2O$/NCO=1.2/1 to 7/1) to form urea and biuret linkages, and providing a void content of 25–60 volume percent, so that the carbon dioxide generated by the water-isocyanate reaction can readily diffuse through the film and so that the vented carbon dioxide does not cause foaming of the composite. Methods of controlling the layering of the composite, and/or mixing it in situ, are also provided.

I have discovered that the problems plaguing the polyurethane particulate vulcanized rubber composite can be eliminated by essentially coating each particulate vulcanized rubber particle with 3.0 to 10.0 microns, preferably 3.0 to 8.0 microns, of a cross-linked binder derived from an essentially solvent-free polymeric isocyanate prepolymer containing 3–10% excess NCO, with a number average molecular weight of 800–4000, the cross-linking being accomplished by controlled reaction with water using an equivalent ratio of NCO/OH from 0.14/1 to 0.83/1 to form urea and biuret linkages, void content controled between 25–60 volume percent, so that the carbon dioxide generated by the isocyanate plus water reaction can diffuse from the binder film without foaming or blowing the composite, which yields a nonporous, elastomeric polyurethane coating around each particulate vulcanized particle. Forcing the water plus isocyanate reaction, by controlling the NCO/OH ratio, eliminates the curing problems that plague conventional polyurethane systems which result from side-reaction of the isocyanate with acid, thiol, amine, and "active hydrogen" groups present in the particulate vulcanized rubber. The invention produces a composite with outstanding durability, hydrolytic stability, and flexibility. Furthermore, this method does not require the complicated and expensive mixing and metering equipment required by prior polyurethane systems, and is thus especially important in the building of recreational surfaces for track and tennis.

Heretofore it has been necessary to prepare a substantially nonporous elastomeric particulate vulcanized rubber composite either by mixing the organic polyisocyanate and polyol together and casting the raction mixture as it solidifies, or by preparing a polymeric isocyanate prepolymer from an organic polyisocyanate and polyol in one step and reacting the polymeric isocyanate prepolymer with a chain extender in the second step. In either case, a substantially nonporous polyurethane can only be prepared by reacting an excess of —NCO per reactive hydrogen groups as determined by the Zerewitinoff method so that the equivalent ratio of —NCO groups to reactive hydrogen —NCO/OH be between 0.9/1 to 1.1/1 and preferably between 1.05/1 to 1.1/1.

A substantially nonporous polyurethane binder can only be prepared by mixing these ingredients under substantially anhydrous conditions because the carbon dioxide generated by the reaction of water and isocyanate will become trapped and produce bubbles in the composite.

BRIEF DESCRIPTION OF THE INVENTION

The present invention relates to composites comprising bonded particulate vulcanized rubber and useful for surfacing; sound absorbing materials; underlayers for recreational surfacings, or other pavements or flooring; as a pad for outdoor carpeting or artificial turf, tile, linoleum, and similar purposes; to simplified methods of preparing such composites to overcome the difficulties in obtaining reproducible results; and the uses of such composites.

Briefly, according to this invention, a shaped composite article having excellent physical properties, outstanding durability, and hydrolytic stability, and which is simple to fabricate and install, and which is useful, for example, in the form or a layer, as a surfacing, or as a playground pad can be formed from a low-viscosity, practically solvent-free polyurethane prepolymer having 3–10% excess of —NCO. Such a composite can be made by coating the particulate vulcanized rubber from scrap tires with 3.0 to 10.0 microns, preferably 3 to 8 microns, of an essentially solvent-free polyurethane prepolymer, a room-temperature-curable, low viscosity liquid reaction mixture of 1,000 cps. – 12,000 cps. The water/isocyanate reaction is forced by using an equivalent ratio of —NCO group to equivalents of water such that the NCO/OH ratio is between 0.14/1 to 0.83/1 and the reaction can be catalyzed by adding a tertiary amine and tin salts as disclosed in U.S. Pat. Nos. 3,822,223 to GEMEINHADT, and 3,821,131 to PRIEST. The resulting reaction mixture can be trowelled or screeded into the desired configuration and the binder allowed to cure at room temperature by the reaction:

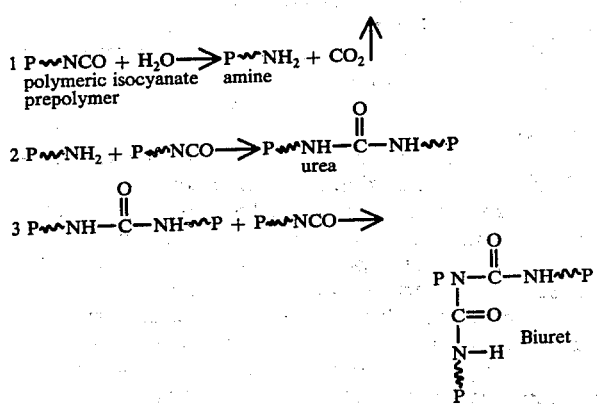

Such a composite is hydrolytically stable, resilient, and flexible, has structural integrity, and good abrasion characteristics, and chemical resistance suitable for a resilient surfacing or padding, and will pass 16 hrs. in a steam autoclave at 250° F., 15 psi steam pressure according to ASTM Method D 2406.

The polymeric isocyanate prepolymers suitable for this reaction are prepared from the reactants and by the methods described in U.S. Pat. Nos. 2,929,800 to Hill, and 2,778,810 to Miller et al. in which an organic polyisocyanate and an organic polyol having at least two groups containing a hydrogen atom determined by the Zerewitinoff method and having a number average molecular weight of 800–4000 and reacting the organic polyisocyanate and organic polyol together with or without a catalytic amount of tertiary amine and a metal salt. The resulting reaction product — polymer isocyanate prepolmer — should have an excess NCO content of 3.0 to 10.0%, a viscosity of 1000 cps–12,000 cps, a number average molecular weight of 800–4000 cps, and be essentially solvent-free. Examples of suitable organic polyols are polyalkalene ether glycols, polyester glycols and homopolymers or copolymers of suitable ethylenically unsaturated monomers such as butadiene and acryonitrile such as ARCO's Polybd resins. Suitable polyols are described in U.S. Pat. No. 3,821,131 to Priest et al. and in "Encyclopedia of Chemical Technology", Volumn 7, pages 257 through 262, and "Encyclopedia of Polymer Science and Technology", Volume 11, pages 62–128, and Volume 6, pages 103–208. The organic polyisocyanate includes those disclosed in U.S. Pat. No. Re. 25,514, such as 2,6-tolyline di-isocyanate, 2,4-tolyline di-isocyanate, p,p-diphenyl methane di-isocyanate, 1,5-naphthalene di-isocyanate, 4,4',4''-triphenyl methane tri-isocyanate and mixtures of these isocyanates.

Commercially available polyurethane prepolymers can be found listed in the Rubber Redbood 1973: i.e. Adiprene L-100 and L-167 from Dupont, Castomer E-007 from Witco, and Trancoa's NS-401.

The technology of manufacturing polyurethane foams and elastomers, as currently practiced, normally has the ratio of the total active hydrogen equivalents (both resin and $H_2O$) between 0.9/1 and 1.0/1. This is done to control the competitive reactions of the isocyanate group with the hydroxyl groups of the polyester or polyether and with the water and amine groups. If the NCO/OH ratio falls outside this ratio, the resulting composite has poor physical properties and cell size of the foam becomes too large and coarse. The ratio of equivalency of $H_2O$ to the active hydrogen equivalent from the polyester and polyether is normally in the range of from 3/1 to 4/1. This is referred to as the urea/urethane ratio and is defined as the theoretical equivalent of urea groups to theoretical equivalent of urethane groups (calculated from the equivalents of water and resin hydroxyl groups used in the formulation). The minimum ratio of urea to urethane groups is determined by the fact that the urea groups are more stable under humid aging conditions than urethane groups; this ratio of 3/1 to 4/1 is required for adequate performance in a conventional system. By using excess of water as a cross-linking agent, the present invention forms urea and biuret linkages instead of urethane and allophanate linkages which contribute to increased hydrolytic stability and higher modulus to the composite which are desirable properties for the applications cited herein.

There may be produced in accordance with certain more specific aspects of the invention a shaped composite in the form of layer from ground rubber from scrap tires with essentially solvent-free, polyurethane prepolymer, room-temperature-curable, low viscosity liquid reaction mixture of (1,000 cps. – 12,000 cps.).

To be suitable for sheet goods, carpet underlay, etc., the ground particulate vulcanized rubber composite must be able to pass a 180° bend over a 1 inch mandrel, have a shear resistance of at least 1000 psi, pass the ASTM D-2406 16 hours Steam Autoclave test and have a tensile strength of at least 75 psi with an elongation of at least 100 percent. These minimum physical properties are required if the unsupported ground rubber composite is to have sufficient structural integrity to survive handling, demolding, and installation. Furthermore, the composite must pass the 180° bend over a 1 inch mandrel without cracking or tearing for the sheet goods to be rolled up for shipping. If the ground rubber composite is used as a wearing surface, the shear resistance should be above 2000 psi.

For recreational applications, the ground rubber composite must exhibit a uniform Bashore resiliency (ASTM 2632) of at least 30° at 25° C. and the free of foamed spot and resin rich areas. While appearance generally does not have any influence on performance of the product, customer acceptance requires that the composite have uniform appearance, resiliency, and feel.

Otherwise expressed, the composite must have a void content of between 25–60%, a number average molecular weight for the prepolymer of between 800 and 4000, an NCO/OH ratio of 0.14/1 to 0.83/1; and a film thickness of the reaction product which coats the rubber particles of from about 3 microns to about 8 microns, and in certain instances to about 10 microns.

The water content of the particulate rubber should be controlled between 0.3-1.0%; preferably 0.4 to 1.0% and the size of the particles should be controlled so that 100% will pass a ½ inch screen, and not over 10% of which will pass a 100 mesh screen (e.g. 0.0050 inch particles). Particle distribution of the particulate vulcanized rubber is controlled to yield a composite of 25-60% voids. The specific surface area of the particulate vulcanized rubber as determined by the standard multipoint B.E.T. technique using krypton adsorption should be controlled between 0.010 $m^2/g$ and 0.090 $m^2/g$. Particle distribution of the particulate vulcanized rubber and binder content is controlled to yield a composite with 25 to 60 percent voids and a binder film thickness of 3.0 to 10.0 microns to enable $CO_2$ generated by reaction (1) to escape without foaming the binder film or the composite. The resulting cured composite has an apparent bulk density of 0.400-0.800 grams per cc. with a preferred apparent bulk density of between 0.500-0.600 grams per cc. Cross-linking by reactions (2) and (3) shown produces composites especially stable hydrolytically, and with improved compression set and resiliency. Neoprene and nitrile rubbers give particularly effective results in certain instances.

The isocyanate prepolymer in the mix may be cured by adsorption of atmospheric moisture to a NCO/OH equivalent ratio of 0.14/1 to 0.83/1.

DETAILED DESCRIPTION OF THE DRAWINGS

Figure 1:
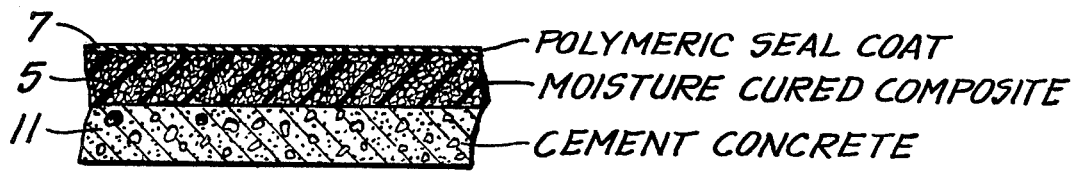
FIG. 1 is a partial cross-section of one type of pavement or surfacing embodying the invention.

The invention is adapted for embodiment in a wide number of constructions. One, illustrated in FIG. 1, embodies a layer 5 of the composite of the invention laid on a base 6 of cement concrete and, cured by absorption of moisture in situ, and thereafter covered with a polymeric coating 7 serving as a seal and as a wear surface.

Figure 2:
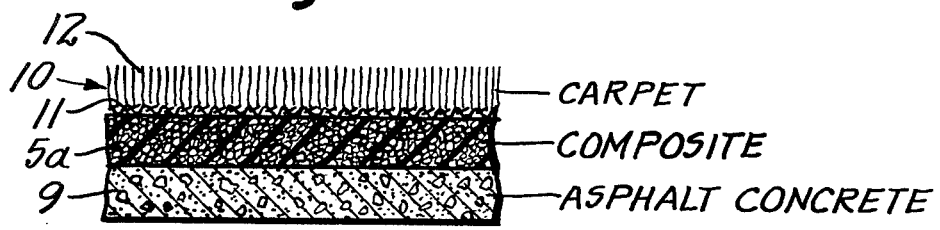
FIG. 2 is a similar view of another type of surfacing providing artificial turf.
Figure 3:
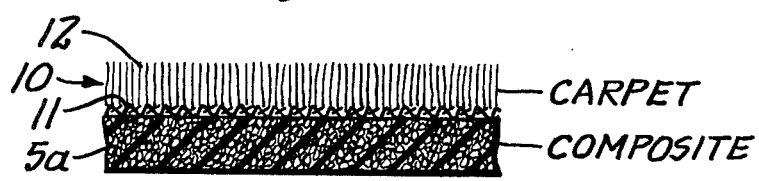
FIG. 3 is a similar view of another arrangement providing artificial turf.

In FIG. 2 there is shown a layer 5a of composite similar to that of composite 5 except that it was precured, overlying a base of asphalt concrete 9 and overlain by carpeting 10 having a bottom 11 and upstanding strand of artificial grass 12, pile fabric or the like, as in the provision of artificial turf;

In FIG. 3 is an artificial turf arrangement without an underlying base, and comprising a layer of composite 5a and carpeting 10.

Figure 4:
FIG. 4 shows an arrangement wherein a layer embodying the invention is used as a sound deadening surface layer.

In FIG. 4 there is shown a layer of composite 5a serving as a surfacing and providing sound and vibration deadening properties, and mounted on a sheet of steel 15.

PREFERRED EMBODIMENTS OF THE INVENTION

Surfacings may be provided comprising, in addition to the layer of composite, one or more layers of metal, wood, polymeric material, carpeting, tile, linoleum, or a polymeric sealer; and may be placed over concrete or the like. The vulcanized rubber in the composite should be dried to a controlled moisture content of 0.1 to 1.0 weight percent.

A suitable composite as previously described was produced for use as an underlayer for recreational surfaces using the formulation listed in Example 1.

The ground particulate vulcanized rubber containing 0.6% water and a particle gradation controlled to yield a specific surface area of 0.0251 $m^2/g$ was charged to a 1 cubic foot concrete mixer and 0.2% additional water was sprayed onto the rubber particles. Polymeric isocyanate prepolymer having a viscosity of 1400 cps. at 25° C., a number average molecular weight of 2800, and 9.2% excess NCO was blended with the catalyst to form Part B and poured onto the particulate vulcanized rubber. An essentially uniform 3.65 micron thick binder coating of each particulate vulcanized rubber particle was obtained in approximately 3 minutes.

The reaction mixture was poured between two movable ⅜ inch steel rods and screed to a uniform thickness. The rods were removed, and the surface rolled and compacted to a bulk density of 0.750g/cc. to yield a void content of 32 volume percent which allowed venting of the $CO_2$ without foaming of the surface. The cured composite had the physical properties as shown and the physical properties meet the requirement for a recreational underlayer and was then overlaid with an elastomeric seal coat to form a recreational surfacing suitable for track, tennis, or basketball.

| Formulation (by weight) | | |
|---|---|---|
| Part A | * Ground Rubber | 90.66% |
|  | $H_2O$ | 0.20% |
| Part B | Polyether Isocyanate prepolymer (Trancoa NS401) | 9.07% |
|  | Triethylamine catalyst | 0.05% |
|  | Tin octalate catalyst | 0.02% |
|  |  | 100.00% |

*Ground rubber from scrap tires (contains 0.6% $H_2O$)

| Sieve Size | % Passing |
|---|---|
| ⅜" | 100 |
| No. 4 | 93 |
| No. 6 | 70 |
| No. 8 | 47 |
| No. 10 | 34 |
| No. 16 | 3 |

Specific Surface Area 0.0251 $m^2/g$

| Description of Trancoa NS401 Polyether Isocyanate Prepolymer | | |
|---|---|---|
| Non volatiles | - | 100% by weight |
| Specific Gravity | - | 1.09 grams per cc. |
| Excess NCO content | - | 9.2% by weight |
| Viscosity at 25° C. | - | 1400 cps. |
| Number average molecular wt. |  | 2800 |
| NCO/OH ratio | - | 0.248/1 |

Physical Properties of Composite
Binder Film Thickness - 3.65 microns
Void Content - 32% by volume (ASTM method - D-1075-54)
Bulk Density - 0.725 g/cc.
Bashore Resiliency at 25° C. - 33%
Flexibility at 25° C. - Passes at 180° bend over 1" mandrel
Ultimate tensile at 25° C. - 135 psi
Ultimate elongation at 25° C. - 170%

-continued

Physical Properties of Composite
Hydrolytic stability - Passes ASTM D-2406
Sheer resistance PSI - 1640

EXAMPLE 2

A suitable, rapid curing composite for use as a laminated rug underlay was prepared utilizing the formulation shown below.

The particulate vulcanized rubber containing 0.6% $H_2O$ and a specific surface area of 0.0251 $m^2/g$ was charged to a mixing bowl and the catalysts and polymeric isocyanate were preblended and the prepolymer was added to the particulate vulcanized rubber. The rubber and polymeric isocyanate prepolymer were mixed thoroughly to yield an essentially uniform coated reaction mixture with a 3.65 micron film of the polymeric isocyanate prepolymer around each rubber particle. The polymeric isocyanate prepolymer had a number average molecular weight of 2800, a viscosity of 1400 cps., and 9.2% excess NCO. The reaction mixture was dumped and spread into a 5 inch by 6 inch by ¼ mold placed on a piece of indoor-outdoor carpeting and screed smooth to yield a 46% void content.

The composite was cured using an NCO/OH ratio of 0.167/1. The composite gelled in 30 minutes at room temperature and self-adhered to the carpeting.

The resulting laminated carpeting has excellent physical properties (as shown below) and superior cushioning and feel. The composite did not debond after 4 hours in boiling water.

| Part A | *Ground rubber (as in Example 1) | 90.40% |
| | $H_2O$ | 0.53% |
| Part B | Polyether isocyanate prepolymer (Trancoa NS401) | 9.00% |
| | Triethylamine catalyst | 0.05% |
| | Tin octalate catalyst | 0.02% |
| | | 100.00% |

*Ground rubber from scrap tires (contains 0.6% $H_2O$)

| Screen Size | % Passing |
|---|---|
| ¼" | 100 |
| No. 4 | 93 |
| No. 6 | 70 |
| No. 8 | 41 |
| No. 10 | 34 |
| No. 16 | 3 |

Specific Surface Area 0.0251 $m^2/g$.

| Description of Trancoa NS-401 Polyether Isocyanate Prepolymer | |
|---|---|
| Nonvolatiles | 100% by weight |
| Specific gravity | 1.09 g per cc. |
| Viscosity at 25° C. | 1400 cps. |
| Excess NCO content | 9.2% by weight |
| Number average molecular weight | 2800 |
| NCO/OH equivalent ratio | 0.167/1 |

Physical Properties of the Composite
Void content 50% by volume (ASTM method D-1075-54)
Bulk Density - 0.529 g/cc.
Bashore resiliency at 25° C. - 33%
Flexibility at 25° C. - Passes at 180° bend over 1" mandrel
Ultimate Tensile Strength, psi - 85
Ultimate Elongation Break, - 110%
Hydrolytic Stability - Passes ASTMD-2406

-continued

Physical Properties of the Composite
Shear Resistance psi - 1100

| Description of Polybutadiene Isocyanate Prepolymer | |
|---|---|
| Non-volatiles | 100% by weight |
| Specific gravity | 1.03 g/cc |
| Excess NCO content | 9.0% |
| Viscosity at 25° C. | 4000 cps. |
| Number average molecular weight | 2700 |
| NCO/OH equivalent ratio | 0.434 |

METHOD OF PREPARING PREPOLYMER

1. ARCO RHT-45 polybutadiene was weighed into a reaction vessel and throughly degassed by heating the resin to 100° C. and evacuated at low vacuum for a minimum of 30 minutes with efficient stirring.

2. The addition of benzoyl chloride (0.03% based on resin) prior to the addition of toluene diisocyanate (TDI) greatly enhances the stability of the prepolymer product. The same amount is added to the completion of the reaction to further insure shelf stability.

3. The benzoyl chloride (0.03% weight percent of the resin) is added under dry nitrogen purge. Then TDI was added slowly through a funnel (5–10 minutes). The temperature rose to 75° C. in about 2 hours. The reaction vessel was being blanketed with nitrogen and the reaction vessel was sealed and left stirring until the reaction cooled to room temperature (about 2 hrs.).

4. 0.03% benzoyl chloride, 0.5% tin octalate and 1.0% triethylamine were added under a blanket of nitrogen. After these ingredients were blended thoroughly, the content of the reaction vessel was poured into a purge nitrogen paint can.

EXAMPLE 3

The ground rubber containing 0.65% $H_2O$ and having a specific surface area of 0.268 $m^2/g$ was weighed into a mixing bowl. The polybutadiene isocyanate prepolymer with catalysts (Part B) having a free NCO content of 9.0%, a viscosity of 4000 cps, and a number average molecular weight of 2700 was poured onto the particulate rubber. The particulate rubber/polymericisocyanate prepolymer mixture was blended thoroughly until the rubber particles appeared to be uniformly coated with 5.38 micron film of the polymeric isocyanate prepolymer. The reaction mixture was spread in a 5 inch by 6 inch by ¼ inch mold placed over a piece of ¼ inch outdoor plywood and cured in situ with an NCO/OH ratio of 0.434/1. The reaction mixture was compacted to a bulk density of 0.646 g/cc to yield a void content of 46 volume percent which permitted the venting of $CO_2$ without foaming the composite or binder film. As previously stated, the resulting laminate has physical properties that make the composite suitable for use as a portable playing surface as shown by the physical properties indicated below:

| Formulation | | |
|---|---|---|
| Part A | *Ground rubber | 87.00% |
| Part B | Polybutadiene Isocyanate prepolymer (ARCO POLYbd RHT45) | 12.84% |
| | Triethylamine | .10% |
| | Tin octalate | .05% |
| | Benzoyl chloride | .01% |

-continued

| Formulation | |
|---|---|
| | 100.00% |

*Ground rubber from scrap tires (contains 0.65% H₂O)

| Screen Size | % Passing |
|---|---|
| No. 4 | 100 |
| No. 8 | 90 |
| No. 12 | 70 |
| No. 16 | 40 |
| No. 20 | 10 |
| No. 40 | 10 |

Specific Surface Area 0.0268 g/m²

Physical Properties of the Composite of Example 3
Binder Film Thickness - 5.38 micron
Void content - 46% by volume (ASTM Method D-1075-54)
Bulk Density - 0.646g/cc.
Bashore resiliency at 25° C. - 41%
Flexibility at 25° C. - Passes 180° bend over ¼"mandrel
Hydrolytic Stability - Passes ASTMD - 2406
Shear Resistance, psi - 2080
Adhesion resistance passes 4 hours boiling water without debonding.

EXAMPLE 4

A tougher, resilient composite suitable for use as shoe soles, bumper pads, or crash pads was prepared from the ingredients shown below.

The ground particulate rubber used in this example was a blend of ⅔ buffing and ⅓ whole tire scrap, and the gradation is controlled to yield a specific surface area of 0.0285 m²/g and contained 0.65% water. The rubber was charged to a Hobart mixer bowl and the polyester isocyanate prepolymer was added and mixed until the rubber particles appeared to be uniformly coated with a 7.44 micron film of the polyester isocyanate prepolymer with an NCO content of 4.0%, a viscosity of 8500 cps, and a number average molecular weight of 1800. The reaction mixture was cast into a 12 inch by 12 inch by 0.125 inch mold and compacted to a void content of 46 volume percent. Curing was accomplished using an NCO/OH ratio of 0.33/1 and the $CO_2$ generated by the water/isocyanate reaction readily escapes from the 7.44 micron film and the 46 volume percent voids providing adequate room for the $CO_2$ to escape without foaming the composite.

The physical properties as shown below indicate that this composite will meet the requirements for uses as shoe soles, a bumper pad, or a crash pad.

| Formulation | | |
|---|---|---|
| Part A | *Ground rubber | 80.0% |
| Part B | Polyester Isocyanate prepolymer (Ioppane P-145) | 18.6% |
| | Tin octalate | 0.25% |
| | Triethylamine | 0.25% |
| | Methylene chloride | 0.90% |
| | | 100.00% |

*Ground rubber (contains 0.65% H₂0)

| Screen Size | % Passing |
|---|---|
| No. 4 | 100 |
| No. 8 | 90 |
| No. 12 | 70 |
| No. 16 | 40 |
| No. 20 | 10 |
| No. 40 | 10 |
| Specific Surface Area | 0.0285m²/g |

Description of Part B Polyester Isocyanate Prepolymer (Ioppane P-145)

| | |
|---|---|
| Non-volatiles | - 95.5% by weight |
| Specific Gravity | - 1.18 g/cc. |
| Excess NCO content | - 4.0% |
| Viscosity at 25° C. | - 8500 cps. |
| Number average molecular weight | - 1800 |
| NCO/OH equivalent ratio | - 0.33 |

PRODECURE FOR PREPARING PART B OF EXAMPLE 4

1. Polyester isocyanate prepolymer (Ioppane P-145) was heated in a 175° C. oven until the prepolymer melted. The melted prepolymer was poured into a nitrogen purge reactor vessel, heated to 100° C., and degassed by evacuation under low vacuum for at least 30 minutes.

2. The vacuum was removed under nitrogen, and a reflux condenser was installed. Methylene chloride, tin octalate and triethylene amine were added while the reactor was being stirred and the mixture was allowed to cool to room temperature.

Physical Properties of the Composite of Example 4
Void content - 46% by volume
Bulk density - 0.634 g/cc.
Hardness, Shore A - 79
Shear Resistance, psi 1160
Ultimate Tensile, psi - 125
Ultimate Elongation - 100%
Bashore resiliency at 25° C. - 30%
Flexibility at 25° C. - Passes a 90° bend over 1" mandrel
Hydrolytic stability - Passes 2 hrs. in boiling water

EXAMPLE 5

A solvent resistance surface, suitable for uses around gasoline pumps or as a factory noise damping composite can be prepared from ground neoprene with size gradation control to yield a specific surface area of 0.0741 m²/g. and dried to a moisture content of 0.5% $H_2O$. A polytetramethylene isocyanate prepolymer with a viscosity 4000 cps., number average molecular weight of 1250, and NCO content of 8.2% was mixed with the rubber using a Hobart Mixer. The contents were mixed until an essentially uniform binder coating of 6.37 microns on the rubber, was obtained. The reaction was molded into a 5" by 6" by ¼" mold over a clean 1/16" thick steel panel and compacted to a void content of 31% by volume. The sample was demolded in 30 minutes and cured in an oven at 50° C. for 1 hour. This composite was bonded to the steel and did not debond after exposure to 4 hours boiling water, or 16 hours at 15 psi steam pressure and 250° F. in a steam autoclave. Furthermore, the composite did not debond after immersion in HAN at 70° C. for 22 hours.

The shear resistance, chemical resistance, and hydrolytic stability of this composite makes this composite ideally suited for use in an environment that requires solvent resistance, or subjection to chemical exposure such as found in industrial environments, or around gasoline pumps.

| Formulation | | |
|---|---|---|
| Part A - | *Ground neoprene rubber from scrap gaskets | 65.00% |
| | H₂O | .38% |
| Part B - | Polytetramethylene isocyanate prepolymer (QO polymeg 1000)- Quaker Oats Company | 31.00% |
| | Methylene chloride | 3.50% |
| | Dibutyltin Dilaurate | .10% |
| | Triethylene Diamine | .02% |
| | | 100.00% |

*Ground rubber contains 0.5%H₂O

| Screen Size | % Passing |
|---|---|
| No. 16 | 100 |
| No. 20 | 99 |
| No. 40 | 39 |
| No. 60 | 9 |
| No. 80 | 1 |
| Specific Surface Area | 0.0741 m²/g |

| Description of the QO Polymeg 1000 Polytetramethylene Isocyanate Prepolymer | |
|---|---|
| Non-volatiles | - 90% |
| Specific Gravity | - 1.06 g/cc. |
| Excess NCO content | - 8.2% |
| Viscosity at 25° C. | - 4000 cps. |
| Number average molecular weight | - 1250 |
| H₂O/NCO equivalent ratio | - 0.77 |

| Physical Properties of Composite of Example 5 |
|---|
| Void Content - 31% by volume |
| Bulk density - 0.729 g/cc. |
| Bashore resiliency at 25° C. - 30% |
| Flexibility at 25° C. - Passes an 180° bend over ⅛" mandrel |
| Passes 22 hrs. immersion in HAN at 158° F. without debonding |
| Hydrolytic stability - Passes ASTM D 2406 |
| Tensile - 280 |
| Elongation - 110% |
| Shear Resistance, psi - 3675 |

By proper selection of the particulate ground rubber and the polymeric isocyanate prepolymer, the composite can be designed to meet the requirements for many applications, and the polymeric isocyanate prepolymer can be pigmented to color the composite or painted and sealed with a variety of materials. However, the NCO-/OH ratio, void content, prepolymer molecular weight, NCO content, and film thickness must be controlled within the limits defined to produce satisfactory particulate vulcanized rubber composite. The following tests were conducted to demonstrate the effect of varying the NCO/OH ratio, void content, molecular weight, NCO content, and film thickness on physical properties.

The standard laboratory procedure used to prepare these composites is weighing of the particulate vulcanized rubber into a mixing bowl and adding the required amount of water and blending thoroughly. The binder is weighed into the mixing bowl, and the polymeric isocyanate prepolymer/particulate vulcanized rubber are blended throughly and cast in a 5" by 6" by 0.25" mold and compacted to the bulk density desired. Samples were aged for 1 week at room temperature, and tested by standard procedures.

COMPARATIVE DATA

Controlling the NCO/OH ratio is the primary method of regulating the reaction rate and forcing the formation of biuret and urea crosslinks. If the NCO/OH ratio is greater than 0.83/1 as in sample A shown in Table I below, the composite requires over 12 hours to cure, and the water/isocyanate reaction was not forced. The composite, therefore, has low shear resistance and poor flexibility because of competition from side-reactions.

If too much water is added to the reaction mixture (NCO/OH ratio lower than 0.14/1), the crosslinking reaction rate is too fast, causing balling in the mixing cycle, difficulty in molding, and a non-uniform product resulting from variations in resiliency, hardness, and bulk density. Usually, an NCO/OH ratio below 0.14/1 will produce a porous binder film and foamed composite as sample D & E in Table I below.

| Formulation | |
|---|---|
| *Ground Rubber | 80.32% |
| Water varied | |
| Trancoa NS401 | 19.68% |
| Polycat 20 | .0001% |

*Same particle distribution and specific surface area as Example 3.

Table I

| | A | B | C | D | E |
|---|---|---|---|---|---|
| Film Thickness | | | 7.98 micron | | |
| NCO/OH Ratio | 1.08 | 0.538 | 0.269 | 0.135 | 0.0897 |
| Void Content | 45.1 | 47.5 | 45.8 | 47.5 | 54.8 |
| 180° Bend, 1" | − | + | + | + | + |
| Moldability | Fair | Good | Good | Poor | Poor |
| Uniformity | OK | OK | OK | 8 hard spots | 11 hard spots |
| Balling | none | none | slight | heavy | heavy |
| Foaming | none | none | none | slight | heavy |
| Shear Resistance, psi | 663 | 1650 | 1630 | 1860 | 2460 |

+pass
−fails

These results indicate that the NCO/OH ratio must be between 0.83/1 to 0.14/1 and preferable between 0.2/1 to 0.4/1 to force the isocyanate/water reaction and yield consistent physical properties and satisfactory crosslinking of the binder.

EFFECTS OF VOID CONTENT ON PHYSICAL PROPERTIES

The void content and bulk density are inversely related. Therefore, the lower the bulk density, the higher the void content. The void content performs the function of providing a place for the venting of the $CO_2$ so that the resulting composite is not blown or foamed. Also, void content can be used to control physical properties. Shear resistance, tensile strength, and resiliency increase as the film thickness increases and the void content decreases (increase in bulk density). Since the binder is the expensive ingredient, the fabricator generally will increase the bulk density to meet a physical property rather than increase the film thickness or binder content. However, the void content for most applications cannot fall below 25 volume percent. Sample A (Table 1A) is unsuitable because the high void content results in insufficient contact of the particles to hold them together. Sample E is unsuitable for the application previously cited because of the difficulty in controlling the dimensions and the non-uniformity of the sample which makes the results difficult to reproduce. The results shown below demonstrate the practical upper limits. The preferred bulk density is between 0.500 to 0.600 g/cc and a void content of 40–50 volume percent.

| Formulation | |
|---|---|
| *Ground Rubber | 80.31% |
| Water | 0.01% |
| Trancoa (NS-401) | 19.68% |
| Polycat 20 | .0001% |

*Same particulate distribution as Example 4 and same binder as Examples 1 and 2.

EFFECT OF VOID CONTENT ON PHYSICAL PROPERTIES

Table 1A

|  | A | B | C | D | E |
|---|---|---|---|---|---|
| Film Thickness | | | 7.98 micron | | |
| NCO/OH | | | 0.246 | | |
| Void Content, Vol. % | 63 | 58 | 50 | 38 | 24 |
| Bulk density, g/cc | 0.446 | 0.506 | 0.605 | 0.750 | 0.910 |
| Shear Resistance, psi | 460 | 1100 | 2150 | 2800 | 4200 |
| Tensile, psi | none | 58 | 135 | 190 | 360 |
| Elongation, % | none | 100 | 160 | 180 | 180 |
| Uniformity | OK | OK | OK | OK | bubbles |
| Moldability | poor | OK | OK | Borderline | fails (Can't control dimensions) |

NCO CONTENT AND MOLECULAR WEIGHT

The NCO content and molecular weight of the prepolymer are related to each other. The number average molecular weight of the polymeric isocyanate prepolymer =

$$\frac{(2) \text{ atomic wgt. of NCO}}{\% \text{ bound NCO as a fraction}} = \frac{(2)(42)}{\text{NCO}/100}$$

$$10\% \text{ NCO} = \frac{(2)(42)}{10/100} = 840 \text{ M.W.}$$

$$3\% \text{ NCO} = \frac{(2)(42)}{3/100} = 2800 \text{ M.W.}$$

If the molecular weight is above 4000, the polymeric isocyanate prepolymer is a solid, and a satisfactory composite is impossible to mix and mold. Example 4 represents the lowest practical NCO content tested that yielded satisfactory results.

If the NCO content is above 10 percent and/or the molecular weight is below 800 g/mole, the binder will not produce a satisfactory composite as demonstrated by samples B & C in Table II below. Sample D viscosity was too high and the polymeric isocyanate prepolymer had to be heated to permit proper mixing. These results demonstrate that the significance of the NCO content range of 3.0 to 10.0 and the molecular weight range of 800 – 4000 will yield satisfactory results. However, the preferred polymeric isocyanate prepolymer has an NCO content of 6–8 percent and a number of molecular weight of 2,000–3,000. This provides sufficient isocyanate to cross-link the binder, has good processing characteristics, and good physical properties.

| Formulation | |
|---|---|
| *Ground Rubber | 80.31% |
| Water | Varied |
| Polymeric isocyanate | |
| Prepolymer | 19.68% |
| Polycat 20 | 0.0001% |

*Same particulate vulcanized rubber as Example 4 and having a specific surface area of 0.0285 m²/g.

EFFECT OF NCO CONTENT & MOLECULAR WEIGHT ON PHYSICAL PROPERTIES

Table II

| Designation | A | B | C | D | E |
|---|---|---|---|---|---|
| NCO content | 9.2 | 18.8 | 12.6 | 10.6 | 10.0 |
| Molecular weight | 2800 | 446 | 1800 | 1200 | 1570 |
| Film Thickness | ← | ← | 7.98 ± 0.80 micron | → | → |
| NCO/OH ratio | ← | ← | 0.25 ± 0.05 | → | → |
| Bulk density | 0.596 | 0.546 | 0.689 | 0.604 | 0.611 |
| 180° Bend | + | − | + | + | + |
| Hydrolyic Stability | + | − | − | + | + |
| Resiliency (Bashore) % | 33 | 14 | 21 | 30 | 36 |
| Shear Resistance, psi | 2150 | 0 | 1410 | 1800 | 2140 |
| Moldability | + | − | − | + | + |
| Uniformity | + | + | + | + | + |

A Trancoa NS 401
B Polymethylene polyphenylisocyanate (PAP I - 135 Upjohn)
C Polyester - MD I terminated prepolymer (Ioppane P-1126 Interpolymer Research Corp.)
D Polyether TDI based prepolymer (Solithane 113 Resin Thiokol Corp.)
E Polyether - TDI prepolymer (Table III) Example D)
− failed
+ passed

FILM THICKNESS $$\text{Film Thickness} = \frac{\text{Volume of Binder}}{\text{Surface Area of 100 g of Ground Rubber}}$$

EXAMPLE NO. 1 AND NO. 2

Ground Rubber = 0.0251 m²/g = 0.0251 × 10⁴ cm²/g
Specific Gravity of Trancoa's NS 401 — 1.09 g/cm²
Volume of Binder = 10.0/1.08 = 9.175 cc $$\text{Film Thickness} = \frac{9.174 \text{ cm}^3}{2.51 \times 10^4 \text{ cm}^2} = 3.65 \text{ micron}$$

EXAMPLE NO. 3

Ground Rubber = 0.0268 m²/ = 0.0268 × 10⁴ cm²/g
Specific Gravity of Prepolymer = 1.03 g/cm³

$$\text{Film Thickness} = \frac{1.18 \text{ cm}^3}{2.68 \times 10^4 \text{ cm}^2} = 5.38 \text{ micron}$$

EXAMPLE NO. 4

Ground Rubber = 0.0285 m²/g = 0.0285 × 10⁴ cm²/g
Specific Gravity = 1.18 g/cc $$\text{Film Thickness} = \frac{21.10 \text{ cm}^3}{2.85 \times 10^4 \text{ cm}^2} = 7.44 \text{ micron}$$

EXAMPLE NO. 5

Ground Rubber = 0.0741 m²lg = 0.0741 × 10⁴ cm²/g
Specific Gravity = 1.06 g/cm³

$$\text{Film Thickness} = \frac{47.17 \text{ cm}^3}{7.41 \times 10^4 \text{ cm}^2} = 6.37 \text{ micron}$$

The selection of the particulate vulcanized rubber particle distribution or specific surface area is the first step in designing a ground rubber composite. The largest rubber particle should pass a screen with a hole size of one-fourth the smallest cross-sectional area of the finished article. The finer the ground rubber, the better the detail that can be molded into the finished article. Once the specific surface area of the rubber has been determined, the film thickness or binder content is optimized to meet the physical properties specification. Normally, it is more economical to increase density to meet a physical properties specification than to increase binder content; however, moldability and uniformity place a ceiling on density. Too high a density results in bubbles and foaming because the low void content prevent venting of $CO_2$ and usually results in products unsatisfactory for the applications previously cited.

Table III

| Formulation | A | B | C | D | E | F |
|---|---|---|---|---|---|---|
| Ground Rubber* | 100 | 100 | 100 | 100 | 100 | 100 |
| Polymeric isocyanate (1) | 10 | 15 | 20 | 25 | 30 | 35 |
| NCO/OH ratio | ← | ← | 0.30 ± 0.1 | → | → | → |
| Film Thickness, psi | 3.0 | 4.50 | 6.00 | 7.50 | 9.00 | 10.5 |
| Bulk density, g/cc | 0.613 | 0.603 | 0.602 | 0.611 | 0.612 | 0.536 |
| 180° Bend 1" | — | ± | + | + | + | + |
| Resiliency (Bashore), % | 25 | 35 | 37 | 36 | 38 | 35–50 |
| Hydrolytic Stability | — | + | + | + | + | + |
| Shear Rresistance | 687 | 985 | 1400 | 2140 | 2520 | 3500 |
| Moldability | — | + | + | + | + | |
| Uniformity | — | + | + | + | 6 hard spots | foamed |
| | G | H | I | J | K | L |
| Ground Rubber* | 100 | 100 | 100 | 100 | 100 | 100 |
| Trancoa's NS401 | 10 | 15 | 20 | 25 | 30 | 35 |
| NCO/OH ratio | ← | ← | 0.30 ± 0.1 | → | → | → |
| Film thickness, psi | 3.19 | 4.79 | 6.39 | 7.98 | 9.58 | 11.4 |
| Bulk density, g/cc | 0.563 | 0.577 | 0.644 | 0.643 | 0.656 | — |
| 180° Bend, 1" | + | + | + | + | + | + |
| Resiliency (Bashore), % | 32 | 33 | 37 | 40 | 38 | 30–43 |
| Shear Resistance psi | 1100 | 1650 | 1865 | 2150 | 2670 | 3030 |
| Uniformity | + | + | + | + | + | foamed |
| Moldability | + | + | + | + | + | + |

*Ground Rubber is same as Example 4 with a specific surface area of 0.0285 m²/g.
+ pass
− fail

| Prepolymer - Polymeric isocyanate (1) | |
|---|---|
| (1) Polyether (NIAX Polyol 16–46) | 100 |
| Tolylene Di-isocyanate (NIAX Isocyanate TDI) | 35.3 |
| Dibutyl tin Dilaurate | 0.3 |
| Polyether has a hydroxyl number of and contains 0.02 percent water | 45.8 |
| Specific gravity | 1.159 g/cc |
| Non-volatile | 100% |
| Color | Amber |
| Viscosity | 1700 cps. |
| NCO Content | 10.0 |
| Molecular weight | 1570 |

The optimum binder film thickness will depend to some extent on the application and physical properties required. A non-wearing surface can have a shear resistance of 1000 psi., while a wearing surface requires at least 2000 psi. Below a binder film thickness of about 3.19 microns, there is insufficient binder film to hold the ground rubber composite together, as shown by sample A. With a binder film of above 9.5 microns as indicated by samples E, F & L, the voids are being filled by binder, and foaming giving an unsatisfactory composite can result. The optimum binder thickness content is from 7.5 to 8.5 microns for a wearing surface, crash pad, shoe soles, and unsupported sheet goods. For supported sheet goods, carpet backing, laminates, and space filling composite, a 3.5 to 4.0 micron thick binder film can be used.

These results indicate the range of physical properties that can be obtained with these composites and particulate vulcanized rubber composite fills the gap in material properties between foam rubber products and solid rubber goods.

I claim:

1. A flexible resilient elastomeric composite composed of vulcanized rubber particles substantially coated and bonded with a cross-linked non-foamed binder consisting essentially of a solvent-free polymeric isocyanate prepolymer cross-linked by urea and biuret linkages and having an excess NCO content of 3–10% and a number average molecular weight between 800 and 4000, said cross-linking of the isocyanate prepolymer being accomplished by the controlled reaction fo prepolymer components in an equivalent ratio NCO-/OH of 0.14/1 to 0.83/1; the film thickness of the prepolymer binder on the rubber particles being from about 3 microns to about 10 microns and the void content of the composition being between 25 and 60 percent.

2. A composition as in claim 1 wherein said film thickness is from about 3 microns of about 8 microns.

3. A surfacing comprising at least one layer of the composite of claim 1.

4. A surfacing as in claim 3 comprising, in addition to the layer of composite, one or more layers of metal, wood, or polymeric material.

5. The surfacing of claim 3 wherein the uppermost layer of the composite has a coat of an elastomeric polymeric sealer.

6. A laminated product comprising the composite of claim 1 bonded to a layer of carpeting, tile, or linoleum.

7. The composite as in claim 1 wherein the vulcanized rubber is dried to a controlled moisture content of 0.1 to 1.0 weight percent.

8. The composite as in claim 1 wherein the vulcanized rubber consists of particles of neoprene or nitrile rubber.

9. A flexible, resilient, elastomeric composite having a void content within the range of from 25–60% comprising 60–95 weight percent vulcanized rubber particles partially or wholly coated and bonded together by 5–40 weight percent of a cross-linking non-foamed binder consisting essentially of a solvent-free polymeric isocyanate prepolymer having urea and biuret cross-linkages; said prepolymer binder having a viscosity at 25° C. of 1,000–12,000 cps., containing 3–10% excess NCO, and having a number average molecular weight between 800–4000, said isocyanate prepolymer being crosslinked by the controlled reaction of said prepolymer with a stoichiometric excess of water in an equivalent ratio of NCO/OH $0.14/_1$ to $0.83/_1$, to form said urea and biuret cross-linkages.

10. The composite as in claim 9 having an excess NCO content of 6–8% and a molecular weight of 2000 – 3000.

11. The composite as in claim 9 having a binder coating thickness of 7.5 – 8.5 microns and adapted for providing ear surfaces, crash barriers, shoe soles and unsupported sheet goods.

12. The composite as in claim 9, having a binder coating thickness of 3.5 to 40 microns and adapted for supported sheet goods, carpet backing, lamination, and space-filling composites and the like.

13. A method of forming a flexible resilient and elastomeric composite which comprises substantially coating vulcanized rubber particles to a thickness of about 3 microns to about 10 microns; with a non-foaming cross-linked binder consisting essentially of a solvent-free polymeric isocyanate prepolymer having a number average molecular weight between 800 and 4000, cross-linking said prepolymer by a controlled reaction with water at an equivalent ratio of NCO/OH of 0.14/1 to 0.83/1 to form urea and biuret cross-linkages; said cross-linked coating having a void content of about 25 percent to 60 percent; and consolidating and bonding said coated particles.

14. The method of forming and spreading a layer of composite which comprises mixing 60–95 weight percent of crumb rubber with 5–40 weight percent of a cross-linking binder derived from an essentially solvent-free polymeric isocyanate prepolymer having a viscosity of 25° C. of 1,000–12,000 cps. and containing 3–10% excess NCO, spreading the layer in situ and curing said binder by absorption of atmospheric moisture by said prepolymer to form urea and biuret crosslinkages at an NCO/HO ratio of 0.14/1 to 0.83/1.

15. A method of forming a surfacing which comprises applying on a base a layer of composite comprising 60–95 weight percent of crumb rubber with 5–40 weight percent cross-linking binder consisting essentially of a solvent-free polymeric isocyanate prepolymer having a viscosity at 25° C. of 1,000–12,000 cps. and containing 3–10% excess NCO, cross-linking said isocyanate prepolymer by the reaction with water, the ratio of NCO/OH being 0.14/1 to 0.83/being controlled to form substantially only urea and biuret linkages, and then sealing said exposed composite layer with a polymeric elastomeric coating.

* * * * *